US005433579A

United States Patent [19]

McNeilus

[11] Patent Number: 5,433,579

[45] Date of Patent: Jul. 18, 1995

[54] ROOF VENT FOR GARBAGE TRUCKS

[75] Inventor: Garwin McNeilus, Dodge Center, Minn.

[73] Assignee: McNeilus Truck and Manufacturing, Inc., Dodge Center, Minn.

[21] Appl. No.: 220,731

[22] Filed: Mar. 31, 1994

[51] Int. Cl.[6] .......... B65G 67/00

[52] U.S. Cl. .......... 414/525.6; 100/90; 414/408

[58] Field of Search .......... 414/406–410, 414/525.2–525.6; 100/90, 100

[56] References Cited

U.S. PATENT DOCUMENTS

| | | | |
|---|---|---|---|
| 632,130 | 8/1899 | Loos | 414/407 |
| 1,056,842 | 3/1913 | Sharp | 220/205 |
| 2,532,947 | 12/1950 | Russell | 100/90 X |
| 2,954,730 | 10/1960 | Moser | 100/90 X |
| 3,144,819 | 8/1964 | Riddell | 100/112 |
| 3,478,909 | 11/1969 | Charles | 414/525.6 X |
| 3,484,006 | 12/1969 | Burke | 414/407 X |
| 3,807,294 | 4/1974 | Ligh | 100/50 |
| 3,818,955 | 6/1974 | Kline | 100/100 X |
| 3,942,601 | 3/1976 | Smith | 414/525.54 X |
| 3,948,163 | 4/1976 | Ligh | 100/53 |
| 4,532,860 | 8/1985 | Simson | 100/90 |
| 4,552,500 | 11/1985 | Ghibaudo et al. | 414/408 |
| 4,951,701 | 8/1990 | Boehmer | 137/199 |
| 4,953,457 | 9/1990 | Campo | 100/90 X |
| 4,991,500 | 2/1991 | Knapp | 100/90 |
| 5,176,488 | 1/1993 | Boda | 414/525.4 |
| 5,275,522 | 1/1994 | Garrett, Jr. et al. | 414/409 X |
| 5,330,307 | 7/1994 | Spiers et al. | 414/409 X |

FOREIGN PATENT DOCUMENTS

| | | | |
|---|---|---|---|
| 841628 | 5/1939 | France | 414/525.5 |
| 1528697 | 12/1989 | U.S.S.R. | 414/408 |

*Primary Examiner*—David A. Bucci
*Attorney, Agent, or Firm*—Haugen and Nikolai

[57] ABSTRACT

A front-loading refuse hauling truck having a plurality of air escape vents defined through an upper wall of a refuse container. The plurality of vents alleviate the formation of laterally extending refuse waves having crests and troughs which would otherwise form air pockets in the container in combination with the compactor body upper wall. A plurality of air escape vents are provided along the entire length of the refuse compactor body such that the body can be completely filled with refuse. Both new and existing refuse hauling trucks of the front-loading and rear-loading type can implement this invention to increase the refuse storage capacity. Both the waste collection companies, and the ultimate consumer stand to benefit from the cost savings of the present invention.

5 Claims, 2 Drawing Sheets

ROOF VENT FOR GARBAGE TRUCKS

BACKGROUND OF THE INVENTION

I. Field of the Invention

The present invention is directed generally to bodies for refuse pick-up trucks, and more particularly, to an improved refuse compactor body of the front-loading type incorporating a plurality of air escape vents for increasing the loading capacity of refuse therein.

II. Description of the Prior Art

Refuse pick-up trucks commonly include a truck chassis fitted with a truck body that is specifically designed for receiving, compacting and discharging refuse materials. One well known custom-made truck body includes a refuse container reservoir accessible for loading refuse at the front and discharging refuse from the rear of the truck. This system includes a hydraulic compacting mechanism which repeatedly compacts the refuse after each loading. This compacting process advances the loaded refuse rearwardly in the truck body toward the rear end thus filling the available volume. The forward wall also forms part of a cylinder-operated ejection mechanism which moves aft to expel the contents of the refuse container reservoir during ejection.

One principle draw back of these prior art refuse pick-up trucks is that during the loading process the contained refuse will eventually extend or bulge upwardly within the refuse container reservoir and meet the top panel of the truck body. The contained refuse essentially forms a laterally extending wave within the reservoir, wherein the crest of this refuse wave creates an air tight seal with the top panel of the refuse container. Air disposed between the laterally extending wave crest and the container forward wall becomes trapped therebetween, inhibiting storage of refuse in this void or air pocket. Typical refuse hauling trucks of this type have large and elongated refuse reservoirs. Thus, several crests and troughs can be formed by the refuse with the air pockets being defined between the crests. The several air pockets which are formed occupy valuable refuse storage space which could otherwise be comprised of refuse, the air pockets sometimes occupying up to 5% of the container volume.

Accordingly, an improved refuse hauling truck which inhibits the formation of refuse crests and troughs and resulting air pockets in refuse hauling trucks is desired.

U.S. Pat. No. 4,991,500 to Knapp discloses a refuse container adapted to hold a poly bag and a manually actuated platen having a pattern of holes in it used to compress paper, garbage and other refuse within the bag lining the container. Holes are provided in the platen such that air can escape through the holes allowing better compaction. However, there is no teaching or suggestion of incorporating vents in the roof panel of a rear-loading refuse hauling truck to solve the particular problem of eliminating refuse crests and troughs to thereby permit a truck to haul a greater pay load.

U.S. Pat. No. 4,953,457 to Campo teaches a chamber in which biodegradable refuse is loaded and allowed to decompose. Vents are provided for allowing the escape of biogases created in the decomposition process. There is no discussion of using air vents to relieve trapped air from a compaction chamber.

U.S. Pat. Nos. 3,807,294 and 3,948,163 to Ligh both depict and describe a stationary compactor or baler having a compaction chamber through which a hydraulic ram driven platen is used to compress refuse deposited therein. A grate is formed in the lateral compactor wall to allow liquid contained in the garbage or refuse to drain out as the refuse is squeezed. There is no teaching or suggestion to a person skilled in the art of designing refuse hauling vehicles of incorporating vents in an upper wall to alleviate the formation of refuse crests and troughs to thereby allow a greater volume of refuse to be hauled.

U.S. Pat. No. 2,532,947 to Russell describes a baler having a plunger adapted to move through a compaction chamber to compress refuse. Vent holes are formed in a lateral wall of the compaction chamber to permit entrained air to escape as the plunger compresses the refuse in the downward direction. There is no discussion provided therein of how a wave pattern is created in a rear-loading type compactor if no vents are used, nor is there any teaching or discussion of a refuse hauling truck.

OBJECTS

It is accordingly a principle object of the present invention to provide a refuse hauling truck which inhibits the formation of refuse crests and troughs therein, thus reducing the formation of air pockets and increasing the storage capacity of waste in the storage compartment.

It is a further object of the present invention to provide a refuse hauling truck with means for increasing the storage capacity of existing front-loading refuse trucks yet which requires minimal modification to existing truck body designs, but which could also be implemented in rear-loading refuse trucks.

SUMMARY OF THE INVENTION

The foregoing objects and advantages are achieved by providing a refuse hauling truck having a plurality of air escape vents defined through a refuse storage reservoir top wall to prevent air from becoming entrapped therein. More particularly, the refuse hauling truck comprises a chassis supported by a plurality of wheels, a cab connected to a forward portion of the chassis for steering the chassis, and means for propelling the chassis such as a motor. A refuse compactor body is mounted onto the chassis behind the cab. The compactor body has a body wall defining a container and has a loading mechanism for inserting refuse therein. The container is particularly characterized as having at least one air escape opening defined through an upper wall thereof for communicating air from the container to the ambient. These air escape openings or vents improve the loading capacity of the compactor body by eliminating the formation of refuse waves having crests and troughs and associated air pockets. Accordingly, as refuse is loaded into the compactor body, air is allowed to escape upwardly through the vents such that refuse can occupy the entire container.

The air escape openings are preferably comprised of L-shaped tubular vents each opening towards the rear of the vehicle to reduce the likelihood of rain entering the compactor body. This design also reduces the likelihood of air being circulated within the compactor body as the refuse hauling truck is driven. The disclosed air escape vents can be adapted to the upper wall of existing refuse hauling trucks using a simple and inexpensive modification procedure. Thus, existing equipment stands to benefit from the present invention as well.

BRIEF DESCRIPTION OF THE DRAWINGS

Other objects, features and advantages of the present invention will become apparent to those skilled in the art through the Description of the Preferred Embodiment, claims, and drawings herein wherein like numerals refer to like elements.

DESCRIPTION OF THE PREFERRED EMBODIMENT

Figure 1:
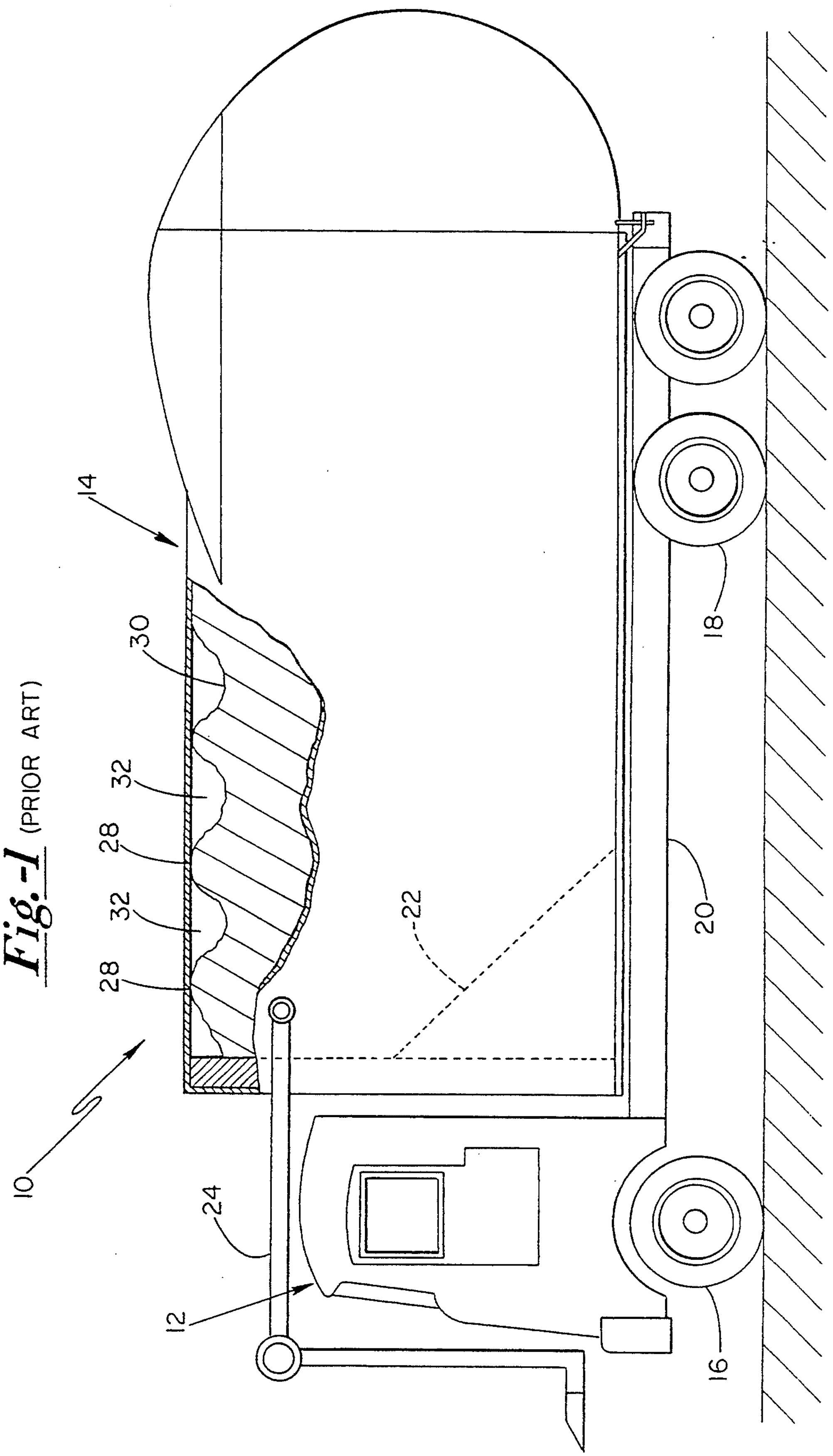
Fig.-1 (PRIOR ART)
FIG. 1 is a partial sectional elevation view of a prior art front-loading refuse hauling truck with refuse forming air pockets between crests.

Referring to FIG. 1, a typical prior art front-loading refuse hauling truck is generally shown at 10. Refuse truck 10 includes a truck body or chassis 12 complete with an engine and a refuse compactor body shown at 14. The truck chassis 12 itself may be of a class of conventional refuse-hauling type chassis including a steerable front-axle assembly complete with wheels, etc., illustrated at 16, and a two-axle rear suspension as illustrated at 18 connected by a relatively heavy box-supporting frame 20 which is also conventional for such vehicles. A conventional refuse ejection pusher is shown in phantom at 22 which is operated by a hydraulic cylinder (not shown) in a well known manner. A large conventional arm 24 for the front-loading compactor is shown at 24.

As illustrated in FIG. 1, front-loading refuse trucks of this type are plagued by the problem of laterally extending refuse waves forming in compactor body 14 as refuse is loaded therein from the rear. These waves are formed by refuse eventually extending or bulging to the upper wall of the compactor body 14 and forming a laterally extending seal therewith. This seal is formed by the crest of the dense refuse wave, such as shown at 28, which wave entraps air in pockets above respective troughs 30 as shown. During repeated loading and compaction procedures, several crests 28 and associated seals will be formed which entrap air in respective pockets 32. Since air has no path to escape, the refuse compactor body 14 will eventually be deemed full and the truck will proceed to a landfill for dumping. Since the refuse compactor body is not entirely full due to the air trapped in air pockets 32, valuable refuse storage space is wasted. This wasted storage space results in higher costs to the waste pick-up company, and ultimately to the consumer.

Figure 2:
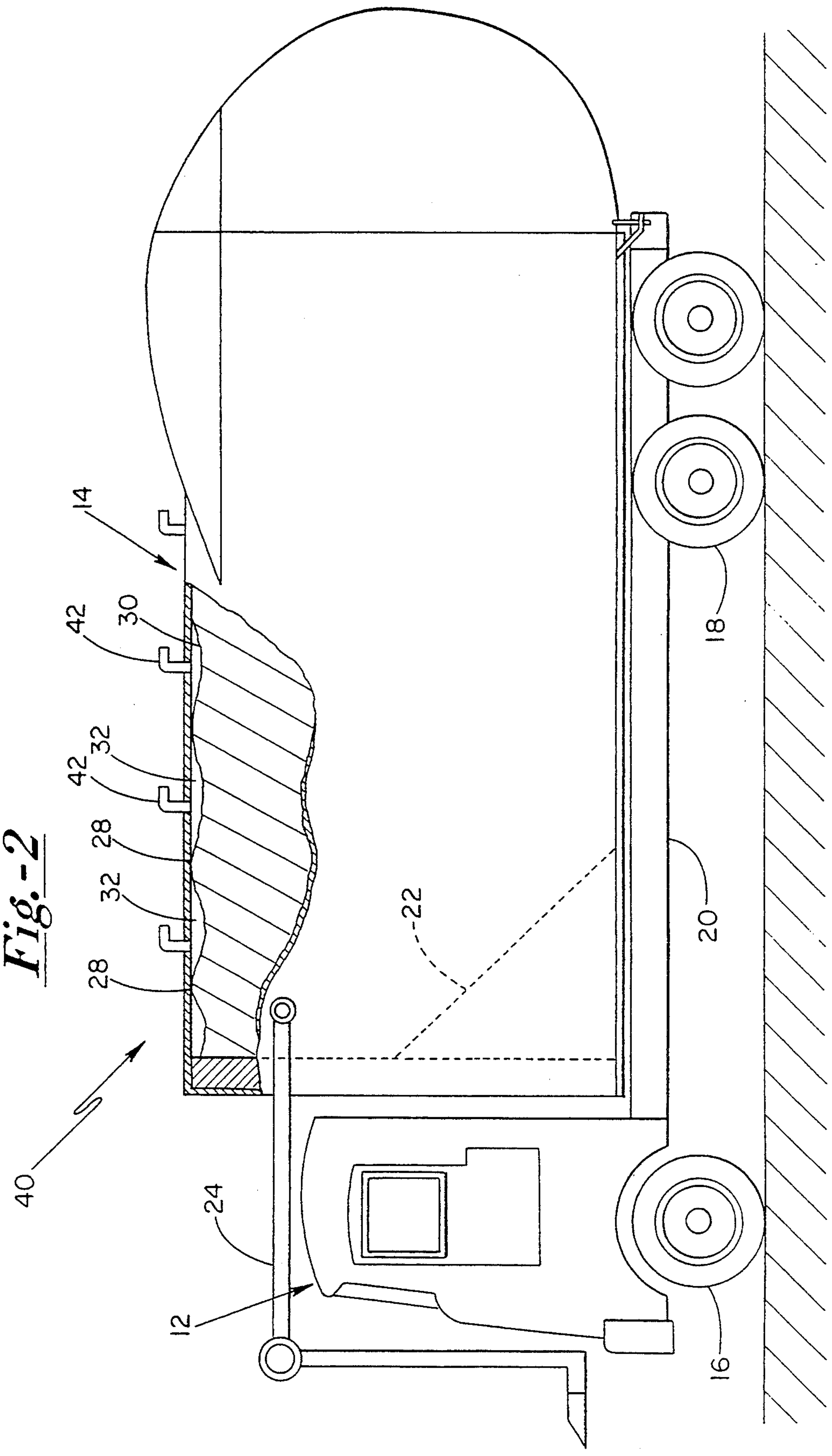
FIG. 2 is a partial sectional elevational view of a front-loading refuse hauling truck according to the preferred embodiment of the present invention including a plurality of air escape vents defined in an upper wall of the compactor body.

Turning now to FIG. 2, a modified front-loading refuse hauling truck according to the preferred embodiment of the present invention and is generally shown at 40. Truck 40 is virtually identical with that of the prior art vehicle 10 shown in FIG. 1, except that it is modified with a plurality of air escape vents 42 extending through and projecting upwardly from an upper wall of the refuse compactor body 14. These air, escape vents 42 are each tubular and have a generally L-shape, each vent opening towards the rear of the truck 40. By incorporating a plurality of vents 42, air which might otherwise become entrapped in air pockets disposed between crests of refuse is now permitted to escape upwardly through the upper wall of the compaction body via the vents 42. Accordingly, waste can be loaded into the front of the vehicle and compacted until refuse extends upwardly to the upper wall along the entire length of the refuse compactor body, as shown, thus occupying the entire volume of refuse compactor body 14. Thus, vents 42 facilitate greater storage capacity of conventional front-loading and rear-loading refuse hauling trucks.

Vents 42 are preferably formed of tubular stainless steel conduits having a cylindrical cross section. Two vents 42 are disposed at predetermined intervals in a side-to-side relationship along the entire length of refuse compactor body 14. By incorporating a plurality of vents 42, laterally extending waves of refuse (see FIG. 1) are inhibited from forming at any location along the length of refuse compactor body 14. Each of the tubular vents 42 extend from the compactor body reservoir to the ambient and open rearwardly to reduce the likelihood of rain entering the refuse compactor body, and further, to reduce the likelihood of air circulating in and out of the refuse compactor body reservoir as the truck 40 is driven. Thus, an unpleasant aroma which may otherwise emanate therefrom is less likely to be noticed by the community.

The present invention is ideally suited for both new and existing front-loading and rear-loading refuse hauling trucks of this type. The existing refuse hauling trucks can be easily, quickly and inexpensively modified to incorporate a plurality of air vents through an upper wall of the storage container as shown. By way of illustration, L-shaped tubular vents 42 are shown, however, limitation to this specific embodiment is not to be inferred. For instance, openings defined through the container upper wall and covered by hoods, for instance, could be incorporated as well to provide an opening allowing air to escape from the refuse compactor body, yet which reduces the likelihood of rain from entering the compactor body or air circulating therewithin. Such alternative vents are considered to be within the scope of this invention.

As the air vents 42 are preferably disposed in the upper wall of the refuse compactor body 14, any liquid which might exist within refuse compactor body 14 is not allowed to seep therefrom. It is further envisioned that air vents which can be selectively closed via sliding covers could be used and are within the scope of this invention. Thus, limitation to an air vent which is continuously opened is not to be inferred.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A waste collection vehicle for storing and hauling refuse, said waste collection vehicle comprising:

(a) a chassis supported by a plurality of wheels;

(b) a cab connected to a forward portion of said chassis having means for steering said chassis;

(c) means coupled to said chassis for propelling said chassis; and (d) a refuse compactor body mounted on the chassis behind the cab, said compactor body characterized as having a body wall defining a container and having means for inserting refuse therein, said container having a means for compacting refuse in said container whereby crests of compacted refuse form in said container and said container having a plurality of means for venting air trapped between crests of compacted refuse from an upper portion of said container to the ambient thereby improving the loading capacity of refuse in said container.

2. The vehicle as specified in claim 1 wherein said plurality of means for venting air comprises at least one air escape opening defined through an upper body wall of said refuse compactor body and extending between said container and the ambient.

3. The vehicle as specified in claim 2 wherein each said air escape opening is comprised of a tubular vent opening to the ambient towards the rear of the vehicle.

4. The vehicle as specified in claim 2 wherein each said air escape opening is provided at a predetermined location along a substantial length of the refuse container.

5. The vehicle as specified in claim 1 wherein said refuse compactor body is of the front-loading type.

* * * * *